(12) United States Patent
Pal et al.

(10) Patent No.: US 10,244,024 B2
(45) Date of Patent: Mar. 26, 2019

(54) DIRECT AIR INTERFACE CONTROL OF TELEMATICS UNIT NETWORK ACCESS DEVICE BY OPERATIONS CONTROL CENTER

(71) Applicant: General Motors LLC, Detroit, MI (US)

(72) Inventors: Dipankar Pal, Sylvania, OH (US); David George, Farmington Hills, MI (US); Saihema Venkataramanan, Detroit, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 268 days.

(21) Appl. No.: 14/812,305

(22) Filed: Jul. 29, 2015

(65) Prior Publication Data

US 2017/0034810 A1 Feb. 2, 2017

(51) Int. Cl.
| | |
|---|---|
| *H04L 29/06* | (2006.01) |
| *H04L 29/08* | (2006.01) |
| *H04W 84/04* | (2009.01) |
| *H04W 4/04* | (2009.01) |

(52) U.S. Cl.
CPC .............. *H04L 65/60* (2013.01); *H04L 67/00* (2013.01); *H04W 4/046* (2013.01); *H04W 84/04* (2013.01)

(58) Field of Classification Search
CPC ......... H04M 1/72522; H04M 1/72525; H04W 24/02; H04W 8/245; H04W 88/02
USPC ................................................ 455/418–420
See application file for complete search history.

(56) References Cited

U.S. PATENT DOCUMENTS

| | | | | |
|---|---|---|---|---|
| 7,894,795 B1* | 2/2011 | Dunne | ................... | H04M 15/00 455/406 |
| 2004/0042450 A1* | 3/2004 | Monroe | ................ | H04W 88/02 370/389 |
| 2010/0234071 A1* | 9/2010 | Shabtay | ............... | H04B 7/0408 455/562.1 |
| 2013/0325249 A1* | 12/2013 | Hering | .................... | G06F 17/00 701/31.5 |
| 2014/0220929 A1* | 8/2014 | Ekberg | ................ | H04L 12/1457 455/406 |
| 2015/0111517 A1* | 4/2015 | Kowalewski | ........... | H04W 4/22 455/404.1 |

* cited by examiner

*Primary Examiner* — Kamran Afshar
*Assistant Examiner* — Nicole M Louis-Fils
(74) *Attorney, Agent, or Firm* — Leydig, Voit & Mayer, Ltd.

(57) ABSTRACT

A method, implemented at a server of an operations control center of a telematics service provider, for transmitting commands to a network access device, is described. The method involves creating one or more command data packets, each comprising a payload and control information, the control information identifying an AT command air interface. The method further involves transmitting, by the server, the command data packets to the network access device via the AT command air interface, wherein the AT command air interface is a first tunnel extending through a network of the vehicular telematics unit. In addition, a method, implemented at a baseband processor of a network access device of a vehicular telematics unit, for receiving commands from a server of an operations control center and a system for transmitting commands between a server of an operations control center and a network access device are also described.

20 Claims, 7 Drawing Sheets

DIRECT AIR INTERFACE CONTROL OF TELEMATICS UNIT NETWORK ACCESS DEVICE BY OPERATIONS CONTROL CENTER

TECHNOLOGY FIELD

The present disclosure relates generally to telematics systems and more particularly to connectivity between telematics service providers and telematics units through which services are provided to users.

BACKGROUND

Telematics units within mobile vehicles provide users with connectivity to a telematics service provider (TSP). The TSP provides users with an array of services ranging from emergency call handling and stolen vehicle recovery to diagnostics monitoring, global positioning system (GPS) aided navigation, map services, and turn-by-turn navigation assistance. In order to provide services to users, the TSP must transmit data to and receive data from a large number of telematics units. Wireless wide area networks (WWANs) provide the infrastructure through which data is transmitted between a TSP's operations control centers (OCCs) and the many telematics units belonging to individual users. In order for a telematics unit to receive data from a TSP OCC and send data to a TSP OCC, the telematics unit must be activated. Activation involves the registration of unique identifiers for the telematics unit with a wireless service provider (WSP). Activation further involves the assignment of network resources to the telematics unit by the WSP. Upon activation, the telematics unit can communicate with a TSP OCC to, e.g., transmit requests to the TSP for provision of services and receive services from the TSP.

The hardware components of a telematics unit that enable connection to the WWAN can be collectively referred to as a network access device (NAD) of the telematics unit. The NAD includes a baseband processor that serves as a mobile termination providing functions that include control of radio transmissions, speech encoding and decoding, error detection and correction, and signaling control. The baseband processor also provides access to a subscriber identity module (SIM) that stores a unique identifier called an international mobile subscriber identity (IMSI). The SIM may be an application contained on a universal integrated circuit card (UICC). A UICC is capable of storing multiple SIM applications and may further store a subscription management module (SMM) serves to control the use of the various SIM applications stored on the UICC. Telematics units additionally include one or more applications processors utilized for providing services to the user as well as for other purposes, e.g. management of the various software components of the telematics unit.

SUMMARY OF THE INVENTION

A method is provided for transmitting commands to a network access device (NAD) of a vehicular telematics unit, the method being implemented at a server of an on call center (OCC) of a telematics service provider (TSP) and comprising creating one or more command data packets, each command data packet comprising a payload and control information, wherein the payload includes at least one attention (AT) command, and the control information identifies an AT command air interface (ATE) dedicated to transmission of AT commands, and transmitting, by the server, the one or more command data packets to the NAD of the vehicular telematics unit via the AT command AIF, wherein the AT command AIF is a first tunnel extending through a network of the vehicular telematics unit.

A method is provided for receiving commands from a server of an operations control center (OCC) of a telematics service provider, the method being implemented at a baseband processor of a network access device (NAD) of a vehicular telematics unit and comprising receiving, by the baseband processor via an AT command delivery air interface (AIF) dedicated to transmission of AT commands, one or more command data packets, each command data packet comprising a payload and control information, wherein the payload includes at least one attention (AT) command, and the control information identifies the AT command delivery AIF, creating, by the baseband processor, one or more response data packets, each response data packet comprising a payload and control information, wherein the payload includes at least one response to an AT command, and the control information identifies an AT command response AIF dedicated to transmission of AT command responses, and transmitting, by the baseband processor, the one or more response data packets to the NAD of the vehicular telematics unit via the AT command response AIF, wherein the AT command AIF is a first tunnel extending through a network of the vehicular telematics unit, and wherein the AT command response AIF is a second tunnel extending through a network of the vehicular telematics unit.

A system for transmitting commands from a server of an operations control center (OCC) of a telematics service provider to a baseband processor of a network access device (NAD) of a vehicular telematics unit, the system comprising the server of the OCC of the telematics service provider, the server comprising a command data packet production module configured to create a command data packet comprising a payload and control information, wherein the payload includes at least one attention (AT) command, and the control information identifies an AT command delivery air interface (AIF) dedicated to transmission of AT commands, and a transmission module configured to provide the command data packet to a modulator for encoding of digital information represented in the command data packet into a transmittable signal, and the baseband processor of the NAD, the baseband processor comprising a receiving module configured to receive, via a demodulator, the command data packet, a response data packet production module configured to create a response data packet comprising a payload and control information, wherein the payload includes at least one AT command response, and the control information identifies an AT command response AIF dedicated to transmission of AT command responses, and a transmission module configured to provide the response data packet to a modulator for encoding of digital information represented in the response data packet into a transmittable signal.

BRIEF DESCRIPTION OF THE DRAWINGS

While the appended claims set forth the features of the present disclosure with particularity, the invention, together with its objects and advantages, may be best understood from the following detailed description taken in conjunction with the accompanying drawings of which:

DETAILED DESCRIPTION

Before discussing the details of the invention and the environment wherein the invention may be used, a brief overview is given to guide the reader. Systems and methods are described herein for establishing dedicated air interfaces (AIFs) for direct transmission of attention (AT) commands from an operations control center (OCC) of a telematics service provider (TSP) to a network access device (NAD) of a vehicular telematics unit. Direct transmission of AT commands from an OCC to a subscriber's NAD allows the OCC to modify, update, and reconfigure the hardware through which the subscriber receives services over the air from a remote location. Direct transmission of AT commands from an OCC to a subscriber's NAD also eliminates the need for the OCC to utilize hardware-specific communication protocols that are specific telematics unit hardware, e.g. command structure and syntax defined by modem chipset manufacturers. Direct transmission of AT commands from an OCC to a subscriber's NAD thereby facilitates the updating of software utilized in connection with the transmission of data between the OCC of the TSP and subscribers that attends the providing of telematics services.

According to certain implementations, establishing dedicated AIFs for direct transmission of command and response data packets involves providing a tunnel between a first endpoint located at an OCC of a TSP and a second endpoint located at a NAD of a subscriber's telematics unit. The tunnel connecting the first and second endpoints can extend through a network of the subscriber's telematics unit and can also extend through a wireless wide area network (WWAN) located between the OCC and the subscriber's telematics unit. The tunnel can extend through a network interface located at a telematics control unit of the subscriber's telematics unit. Such a network interface can be operated by a mobile broadband interface model (MBIM) driver or by a universal serial bus (USB) driver. The tunnel can also extend through a network interface located at an NAD of a subscriber's telematics unit that is operated by an MBIM driver or a USB driver. Various protocols, for example point-to-point protocol (PPP) can be used to create the virtual network interfaces of the tunnel. However, alternatives to PPP can also be used.

Figure 1:
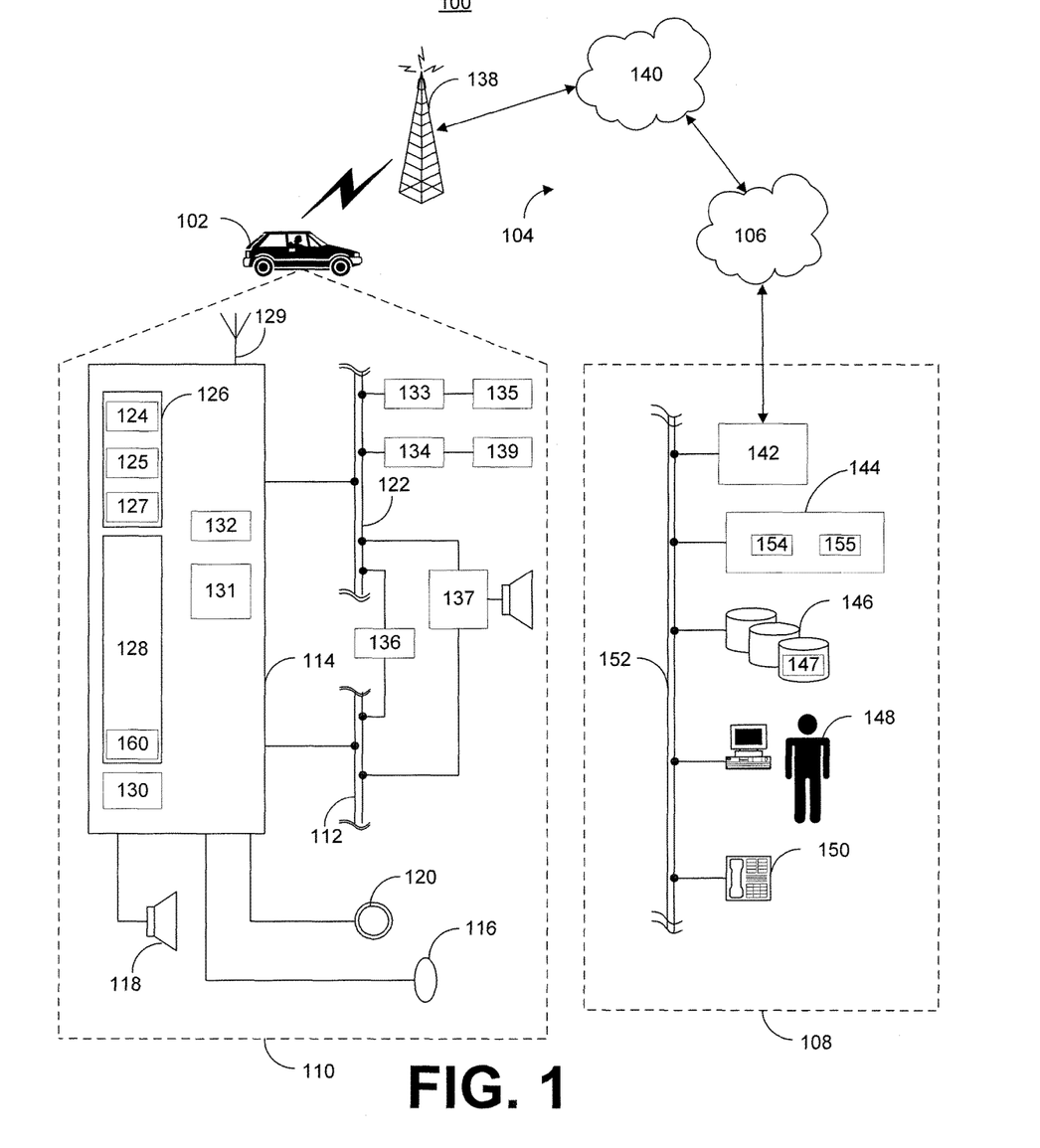
FIG. 1 is a functional block diagram of an operating environment for a mobile vehicle communication system according to one implementation of the principles described herein.

FIG. 1 provides an example computing and network communications environment in which the principles described herein can be implemented. The computing and network communications environment depicted in FIG. 1 is an example and does not imply any limitation regarding the use of alternative computing and network communications environments to practice the invention. With reference to FIG. 1 there is shown an example of a communication system 100 that may be used with the present method and system and generally includes a vehicle 102, a mobile wireless network system 104, a land network 106 and an operations control center (OCC) 108 associated with a particular TSP. It should be appreciated that the overall architecture, setup and operation, as well as the individual components of the communication system 100 is generally known in the art. However, other systems are contemplated that are capable of incorporating the described database and processor functionality described herein. The principles described herein are applicable to apparatuses capable of sending information to, receiving information from, or both sending information to and receiving information from a telematics service provider (TSP), e.g. vehicular telematics units, smart phones, tablet computers, laptop computers, etc.

Vehicle 102 is a mobile vehicle such as a motorcycle, car, truck, recreational vehicle (RV), boat, plane, etc., and is equipped with suitable hardware and software that enables it to communicate over system 100. The vehicle 102 is, in particular, driven by an electric motor that periodically requires recharging. Additionally, vehicle hardware 110 shown generally in FIG. 1 includes: a telematics unit 114, a microphone 116, a speaker 118, and buttons and/or controls 120 connected to the telematics unit 114. A network connection or vehicle bus 122 is operatively coupled to the telematics unit 114. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name but a few.

The telematics unit 114 is an onboard device providing a variety of services through its communication with the OCC 108, and generally includes a telematics control unit (TCU) 128, one or more types of electronic memory 130, a baseband processor 124, a wireless modem 125, a universal integrated circuit card 127, a dual antenna 129 and a navigation unit containing a GPS chipset/component 132. The TCU 128 includes a TCU processor 160. The GPS chipset/component is capable of determining the location of the vehicle with a high degree of accuracy. In one example, the wireless modem 125 comprises, and is carried out in the form of, a computer program and/or set of software routines executing within the TCU 128.

The baseband processor 124 and the wireless modem 125 may be called the network access device (NAD) 126 of the telematics unit 114. In some implementations, the NAD 126 of the telematics unit 114 further includes a short-range wireless unit 131 capable of communicating with a user's mobile device such as a cellular phone, tablet computer, PDA, or the like, over a short-range wireless protocol. For example, in one implementation, the short-range wireless unit 131 is a Bluetooth unit with an RF transceiver that communicates with a user's mobile device using Bluetooth protocol. A UICC 127 can store a variety of identifiers and parameters necessary to enable the telematics unit 114 to communicate through a wireless wide area network (WWAN) 104. The UICC 127 can store an integrated circuit card identifier (ICCID) corresponding to the UICC 127, an international mobile subscriber identity (IMSI) associated with the UICC 127, a mobile station international subscriber directory number (MSISDN), and other identifiers assigned by one or more MWNSPs or related to subscriptions with one or more MWNSPs.

The telematics unit 114 provides a variety of services for subscribers. Examples of such services include: turn-by-turn directions and other navigation-related services provided in conjunction with the GPS based chipset/component 132; airbag deployment notification and other emergency or roadside assistance-related services provided in connection with various crash and or collision sensor interface modules 133 and sensors 135 located throughout the vehicle.

GPS navigation services are implemented based on the geographic position information of the vehicle provided by the GPS based chipset/component 132. A user of the telematics unit enters a destination using inputs corresponding to the GPS component, and a route to a destination is calculated based on the destination address and a current position of the vehicle determined at approximately the time of route calculation. Turn-by-turn (TBT) directions may further be provided on a display screen corresponding to the GPS component and/or through vocal directions provided through a vehicle audio component 137. It will be appreciated that the calculation-related processing may occur at the telematics unit or may occur at a OCC 108.

Infotainment-related services are provided by the TSP wherein music, Web pages, movies, television programs, video games and/or other content is downloaded to an infotainment center 136 operatively connected to the telematics unit 114 via a vehicle bus 122 and an audio bus 112. In one example, downloaded content is stored for current or later playback.

The preceding list of functions is by no means an exhaustive list of all of the capabilities of telematics unit 114, as should be appreciated by those skilled in the art, but is simply an illustration of some of the services that the telematics unit 114 offers. The telematics unit 114 may include a number of components known by those skilled in the art in addition to those described above.

Vehicle communications use radio transmissions to establish a communications channel within the WWAN 104 so that voice and/or data transmissions occur over the communications channel. Vehicle communications are enabled via the baseband processor 124 for voice communications and a wireless modem 125 for data transmission. For example, data pertaining to a forecast of a utility's renewable energy mixture can be transmitted to the telematics unit 114 via the wireless modem 125.

To enable successful data transmission over the communications channel, wireless modem 125 applies some form of encoding or modulation to convert the digital data so that it can communicate through a vocoder or speech codec incorporated in the baseband processor 124. Any suitable encoding or modulation technique that provides an acceptable data rate and bit error can be used with the present method. The dual mode antenna 129 services the GPS chipset/component and the cellular chipset/component.

The microphone 116 provides the driver or other vehicle occupant with a means for inputting verbal or other auditory commands, and can be equipped with an embedded voice processing unit utilizing a human/machine interface (HMI) technology known in the art. The speaker 118 provides verbal output to the vehicle occupants and can be either a stand-alone speaker specifically dedicated for use with the telematics unit 114 or can be part of an audio component 154. In either case, the microphone 116 and the speaker 118 enable the hardware 110 and the OCC 108 to communicate with occupants of the vehicle 102 through audible speech.

The vehicle hardware also includes the one or more buttons or controls 120 configured to enable a vehicle occupant to activate or engage one or more of the vehicle hardware components 110. For example, one of the buttons 120 is an electronic push button that, when pressed, initiates voice communication with the OCC 108 (whether it be a live advisor 148 or an automated call response system). In another example, one of the buttons 120, when pushed, initiates emergency services.

The audio component 137 is operatively connected to the vehicle bus 122 and the audio bus 112. The audio component 137 receives analog information, rendering it as sound, via the audio bus 112. Digital information is received via the vehicle bus 122. The audio component 137 provides AM and FM radio, CD, DVD, and multimedia functionality independent of the infotainment center 136. The audio component 137 contains a speaker system, or alternatively utilizes the speaker 118 via arbitration on the vehicle bus 122 and/or the audio bus 112.

The vehicle crash and/or collision detection sensor interface 133 is operatively connected to the vehicle bus 122. The crash sensors 135 provide information to the telematics unit 114 via the crash and/or collision detection sensor interface 133 regarding the severity of a vehicle collision, such as the angle of impact and the amount of force sustained. Vehicle sensors 139, connected to various sensor interface modules 134 are operatively connected to the vehicle bus 122. The sensor interface modules 134 can include power train control, climate control, and body control, to name but a few.

The WWAN 104 can be a cellular telephone system or any other suitable wireless system that transmits signals between the vehicle hardware 110 and the land network 106. According to an example, the WWAN 104 includes one or more cell towers 138, base stations and/or mobile switching centers (MSCs) 140, as well as any other networking components required to connect the WWAN 104 with the land network 106. The mobile switching center may include a remote data server.

As appreciated by those skilled in the art, various cell tower/base station/MSC arrangements are possible and could be used with the WWAN 104 (also referred to as the "cellular network" herein). For example, a base station and a cell tower could be co-located at the same site or they could be remotely located, a single base station could be coupled to various cell towers, and various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network component as well.

The land network 106 is, for example, a conventional land-based telecommunications network connected to one or more landline telephones and connecting wireless carrier network 104 to OCC 108. For example, the land network 106 includes a public switched telephone network (PSTN) and/or an Internet protocol (IP) network, as is appreciated by those skilled in the art. Of course, one or more segments of the land network 106 are implemented in the form of a standard wired network, a fiber or other optical network, a cable network, other wireless networks such as wireless local networks (WLANs) or networks providing broadband wireless access (BWA), or any combination thereof.

The OCC 108 is designed to provide the vehicle hardware 110 with a number of different system back-end functions and, according to the example shown here, generally including one or more routing elements 142, servers 144, databases 146, live advisors 148, and a variety of other telecommunication and computer equipment 150 that is known to those skilled in the art. These various OCC components are coupled to one another, for example, via a network connection or bus 152, such as the one previously described in connection with the vehicle hardware 110. Routing element 142, which can be a private branch exchange (PBX) switch, routes incoming signals so that voice transmissions are usually sent to either the live advisor 148 or an automated response system, and data transmissions are passed on to a modem or other piece of telecommunication and computer equipment 150 for demodulation and further signal processing.

The telecommunication and computer equipment 150 includes a modem that preferably includes an encoder, as previously explained, and can be connected, via the network connection or bus 152, to various devices such as application servers 144 and databases 146. For example, the databases 146 could be designed to store subscriber profile records, subscriber behavioral patterns, or any other pertinent subscriber information. Although the illustrated example has been described as it would be used in conjunction with a manned communications center, it will be appreciated that the OCC 108 can be any central or remote facility, manned or unmanned, mobile or fixed, to or from which it is desirable to exchange voice and data.

A portion 147 of the databases 146 stores information pertaining to an identity of the telematics unit 114. For example, the portion 147 of the databases 146 may store, for the vehicle 102, an integrated circuit card identifier (ICCID) corresponding to the universal integrated circuit card (UICC) of the telematics unit 114, an international mobile equipment identity (IMEI) corresponding to network access devices (NADs) integrated into the telematics unit 114, a mobile identification number (MIN), an electronic serial numbers (ESN), a mobile equipment identifier (MEID), an international mobile subscriber identity (IMSI) associated with the UICCs of the vehicle's telematics unit, a mobile device number (MDN), a mobile station international subscriber directory number (MSISDN), a service set identifier (SSID), a media access control (MAC) address, and an internet protocol (IP) address associated with the vehicle's telematics unit. Additional information pertaining to a subscriber affiliated with a particular telematics unit 114 may also be stored in the portion 147 of the databases 146. For example, billing information associated with the subscriber may be stored in the portion 147. The preceding examples of information that can be stored within the portion 147 of the databases 146 is not exhaustive, and additional types of data may also be stored within the portion 147.

The servers 144 interface with mobile wireless network service providers (MWNSPs), databases 146, and telematics units such as the telematics unit 114. The servers 144 have processors that can be configured to request and receive information from telematics units such as the telematics unit 114. In some implementations, information requested and received by the servers 144 is subsequently stored in the databases 146. The servers 144 include at least one processor configured to perform direct transmission of attention (AT) commands to the NAD 126 of the telematics unit 114. Said processor includes a command data packet production module 154 configured to create a command data packet comprising a payload and control information. The command data packet production module 154 is configured to write data representative of an AT command into the payload of the command data packet and is further configured to write data representative of control information into the command data packet. For example, the command data packet production module 154 is configured to write control information identifying an AT command air interface (AIF) into a header of the command data packet. The control information can include, for example, an address of one or more network interfaces, for example, a network interface of the NAD 126. The server 144 further includes a transmission module 155 configured to provide the command data packets produced by the command data packet production module 154 to the routing element 142 for transmission to the NAD 126 of the telematics unit 114. The routing element 142 may include a modulator configured to encode digital information specified by command data packets into a physical, transmittable signal.

Figure 2:
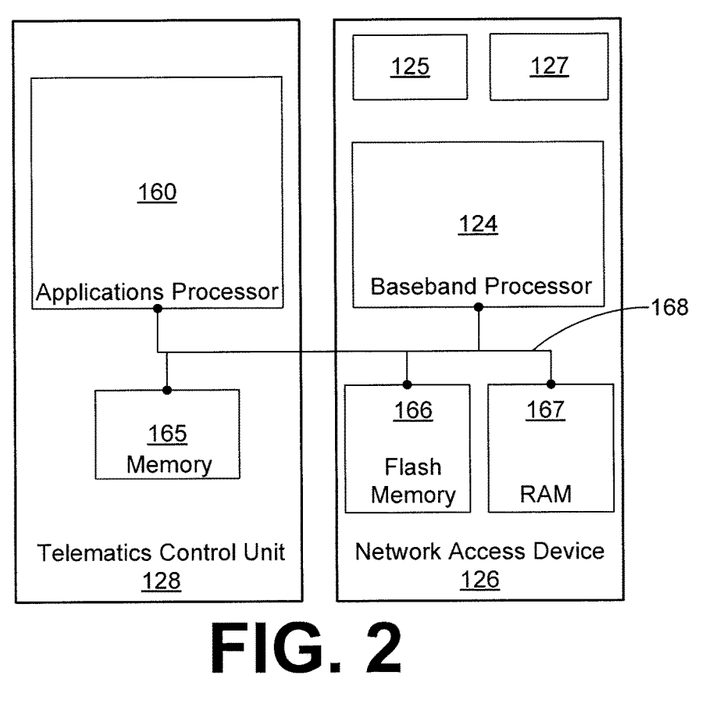
FIG. 2 is a functional block diagram of a telematics unit according to one implementation of the principles described herein.

FIG. 2 is a functional block diagram of components of the telematics unit 114 according to one embodiment. FIG. 2 depicts various components described in the above description of FIG. 1. FIG. 2 depicts a network 168 extending between the TCU processor 160 of the telematics control unit 128 and the baseband processor 124. The network 168 is further connected with memory 165, which may include both volatile and non-volatile storage media and which may store a variety of data for various applications executed by the TCU processor 160 and involved in providing telematics services to a user. The network 168 is also connected with flash memory 166 and random access memory (RAM) 167. Flash memory 166 and RAM 167 store a variety of software routines and mobile configuration settings for use by the baseband processor 124. For example, such mobile configuration settings and software routines may specify protocols for voice coding and decoding, protocols for uplink and downlink transmissions to and from the OCC 108, protocols for registration with the WWAN 104, and protocols for signaling the WWAN 104.

Figure 3:
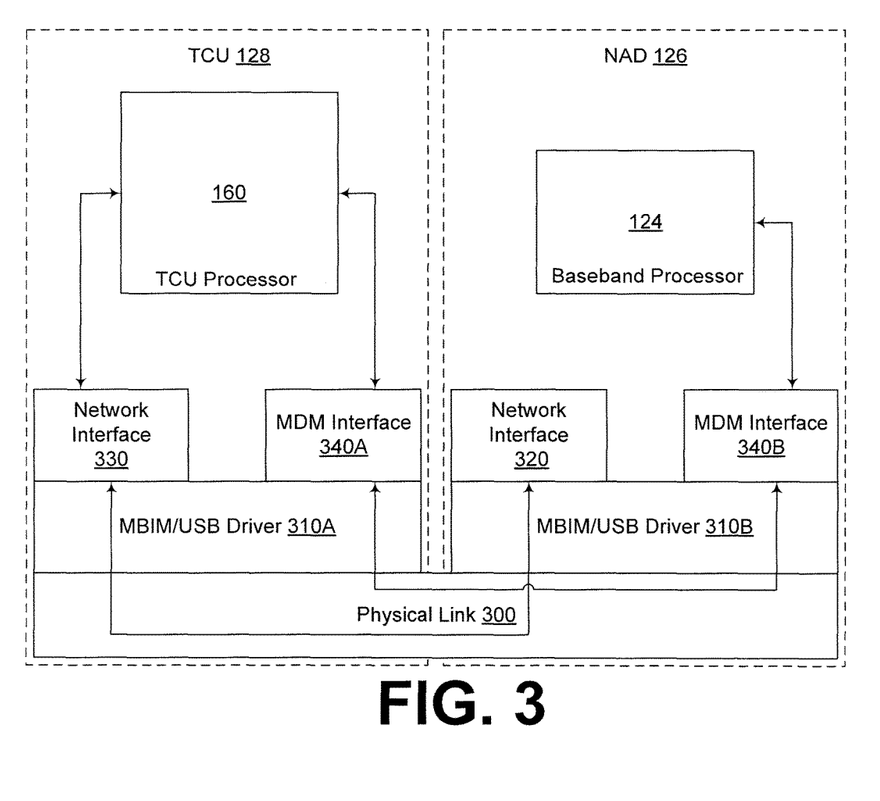
FIG. 3 is a functional block diagram of components of a telematics unit involved in transmission of commands and command responses according to one implementation of the principles described herein.

FIG. 3 is a functional block diagram of components of the telematics unit 114 involved in transmission of AT commands and AT command responses according to one embodiment. FIG. 3 depicts a number of elements described above in connection with the descriptions of FIGS. 1 and 2. In addition, FIG. 3 depicts a physical link 300 between the TCU 128 and the NAD 126. The physical link 300 is utilized by the network 168 described above in connection with FIG. 2. FIG. 3 also depicts a mobile broadband interface model (MBIM)/universal serial bus (USB) driver 310A at the TCU 128 and a mobile broadband interface model (MBIM)/universal serial bus (USB) driver 310B at the NAD 126. The MBIM/USB drivers 310A and 310B operate the network interface 320 and the network interface 330, as well as the MDM interfaces 340A and 340B. The MDM interfaces 340A and 340B are identified by a network address and can be virtual physical network interfaces. Similarly, network interfaces 320 and 330 are identified by a network address and can be virtual physical network interfaces.

The AT command AIF and the AT response AIF described herein include, or utilize, various components depicted in FIG. 3. For example, the AT command AIF and the AT response AIF may both be a tunnel having an endpoint at any of the MDM interface 340A, the MDM interface 340B, the baseband processor 124, or the TCU processor 160. The establishment of the AT command AIF and the AT response AIF can involve the assignment of a virtual physical network interface address to any of the MDM interface 340A, the MDM interface 340B, the baseband processor 124, or the TCU processor 160. During transmission of AT commands, a virtual physical network interface address corresponding to any of the MDM interface 340A, the MDM interface 340B, the baseband processor 124, or the TCU processor 160 can be included in a header of an AT command data packet, e.g. the AT command data packet depicted in FIG. 6.

AT command AIF and the AT response AIF include both the MDM interface 340A and MDM interface 340B. During transmission of the AT command data packets from the OCC 108 to the baseband processor 124, the AT command data packets are transmitted via the WWAN 104, the dual mode antenna 129, and the NAD 126 to the TCU processor 160. The transmission of the AT command data packets from the OCC 108 to the baseband processor 124 involves tunneling the AT command data packets through the NAD 126, the network interface 320, the network interface 330 at the TCU 128, and to the TCU processor 160. The TCU processor 160 identifies control information stored in, e.g., a header of the AT command data packets. The control information can uniquely identify the MDM interface 340A by including a port number uniquely assigned to the MDM interface 340A. Thereafter, the AT command data packets are transmitted by the TCU processor 160 to the MDM interface 340B at the NAD 126 via the MDM interface 340A and thereafter to the baseband processor 124. The receipt of a packet by the baseband processor 124 via the MDM interface 340B at the NAD 126 can cause the wireless modem 125 to switch an operational mode from a data mode to a command mode and thereby temporarily suspend transmission of data received, e.g. at the network interface 330. Upon receipt of the AT commands at the baseband processor 124, they can be executed.

During transmission of the AT response data packets from the baseband processor 124 to the OCC 108, the AT response data packets are transmitted via the network 128 to the TCU processor 160. Thereafter the AT response data packets are transmitted by the dual mode antenna 129 and the WWAN 104 to the routing element 142 of the OCC 108. The transmission of the AT response data packets from the baseband processor 124 to the OCC 108 can involve tunneling the AT response data packets to a port at the OCC 108, e.g. a port at the routing element 124. The AT response data packets can include control information identifying a port number of a port at the routing element 142, an IP address of the routing element 142, and a protocol type used for transmissions between the MDM interface 340B and the routing element 142. During such transmission, the TCU processor 160 may be configured to identify that a packet was received via the MDM interface 340A and determine the destination of such a packet should be a particular port at the routing element 142. In other words, the TCU processor 160 may be configured to forward all data packets received via the MDM interface 340A to the OCC 108 by associating such data packets with a port number identifying a port at the routing element 142, an IP address of the routing element 142, and a particular transmission protocol.

MDM interfaces 340A and 340B are, in various implementations software constructs serving as communications endpoints, i.e. ports. The MDM interfaces 340A and 340B are identified by a particular port number. AT command data packets transmitted to the NAD 126 can have a packet header or other structure that stores the port number of the MDM interfaces 340A and 340B. The MDM interfaces 340A and 340B can also be, in various implementations, associated with an internet protocol (IP) address of any one or more of the TCU 128, the TCU processor 160, or the telematics unit 114. The MDM interfaces 340A and 340B can further be associated with a protocol type of the communication used for routing communications between the OCC 108 and the NAD 126 via the MDM interfaces 340A and 340B. The protocols that are used for routing communications between the OCC 108 and the NAD 126 can include various transport layer protocols, such as transmission control protocol (TCP) and user datagram protocol (UDP) of the Internet Protocol Suite. Point-to-point protocol (PPP) can also be used for transmission of AT command data packets and AT response data packets between the OCC 108 and the NAD 126. In such implementations where PPP is used for transmission of AT command data packets and AT response data packets, the MDM interfaces 340A and 340B can be assigned their own IP address.

Figure 4:
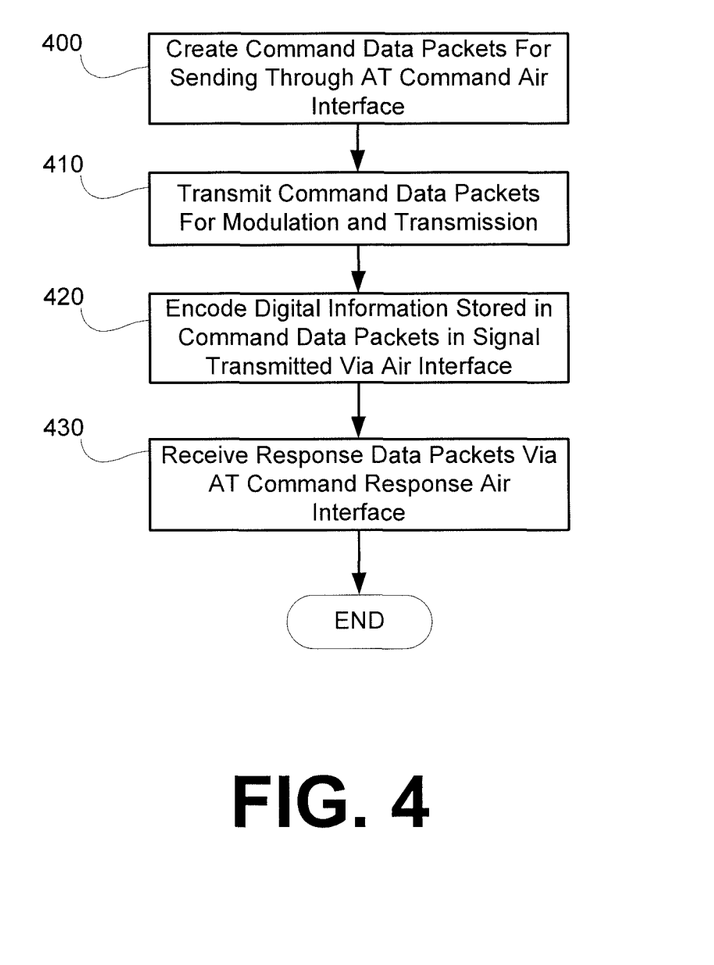
FIG. 4 is a flow diagram of a method implemented at a server of an operations control center of a telematics service provider according to the principles described herein.

FIG. 4 is a flow diagram of a method implemented at the server 144 of the OCC 108 according to one embodiment. At step 400, the server 144 creates one or multiple command data packets for sending through an AT command AIF. In particular, the one or multiple command data packets are created by a processor located at the server 144, and in particular the command data packet production module 154. The one or multiple command data packets include a payload and control information. The command data packet production module 154 is configured to write AT commands into the payload of the command data packet and is further configured to write data representative of control information into the command data packet. For example, the command data packet production module 154 is configured to write control information an AT command AIF into a header of the command data packet. The control information can include a port number, an IP address, and a protocol type identifying the AT command AIF. For example, the second endpoint can be identified by a port number of the MDM interface 340A, an IP address of the TCU processor 160, and the TCP protocol. The command data packets can be stored temporarily in a volatile or non-volatile storage medium of the server 144.

At 410, the server 144 transmits the command data packets for modulation and transmission through the AT command AIF. The transmission at 410 is performed by the transmission module 155. Modulation and transmission through the AT command AIF may be performed by the routing element 142 or may be distributed between the routing element 142 and various components of the land network 106 and the WWAN 104.

At 420, the digital information stored in the command data packets is encoded into a signal transmitted through the AT command AIF, or through a portion thereof. The AT command AIF is a tunnel between a first endpoint and a second endpoint and extends through a network of the telematics unit 114, e.g. a network connecting the TCU 128 to the NAD 126. The first endpoint may be the routing element 142 of the OCC 108, the server 144, or another network element or a component thereof. The AT command AIF tunnel also extends through the WWAN 104. In various implementations, the AT command AIF tunnel can be established using PPP where the first endpoint and the second endpoint are virtual physical network interfaces identified by a network address.

At 430, the server 144 receives, from the NAD 126 of the telematics unit 114, one or more AT response data packets via an AT response AIF. The AT response AIF is a tunnel between a first endpoint and a second endpoint and extends through a network of the telematics unit 114, e.g. a network connecting the TCU 128 to the NAD 127. The AT response AIF tunnel also extends through the WWAN 104. The first endpoint can be but is not limited to any of the routing element 142 of the OCC 108, the server 144, or another network element or a component thereof. The second endpoint can be but is not limited to any of the MDM interface 340A, the MDM interface 340B, the baseband processor 124, or any other network component of the NAD. The AT response AIF tunnel also extends through the WWAN 104. The first endpoint and the second endpoint can be virtual physical network interfaces identified by a network address. The first and second endpoints can be identified by a port number, an IP address, and a protocol type. For example, the second endpoint can be identified by a port number of the MDM interface 340A, an IP address of the TCU processor 160, and the TCP protocol.

Figure 5:
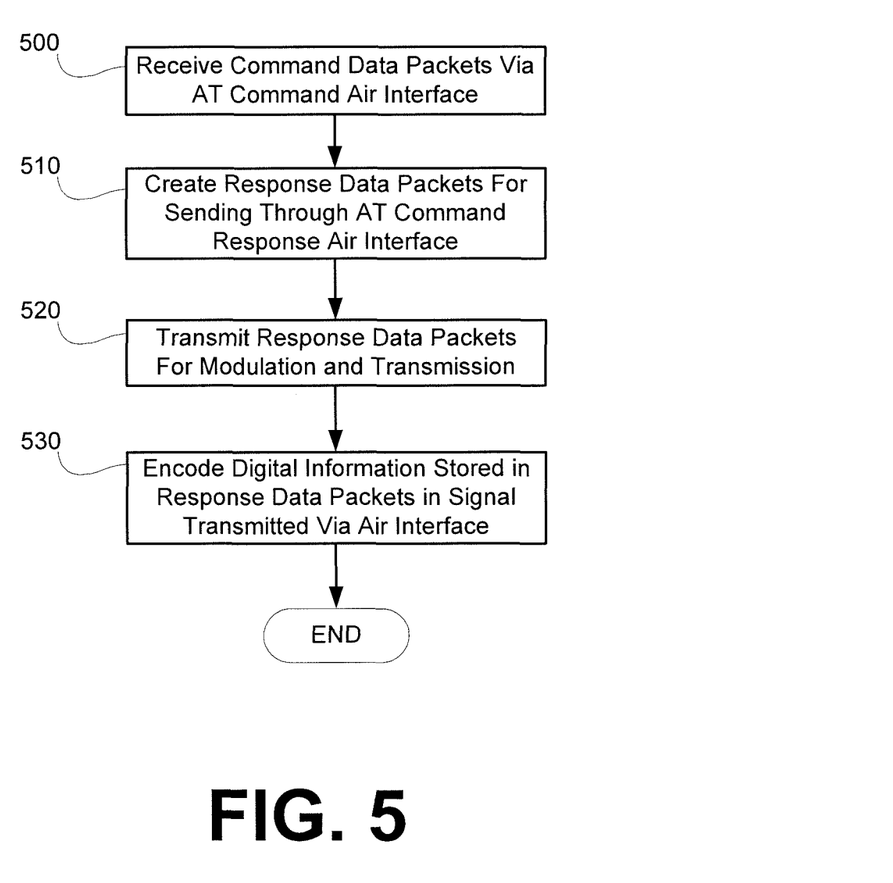
FIG. 5 is a flow diagram of a method implemented at a baseband processor of a network access device according to the principles described herein.

FIG. 5 is a flow diagram of a method implemented at the baseband processor 124 of the network access device 126 according to one embodiment. At step 500, the baseband processor 124 receives, from the OCC 108, one or more AT command data packets via an AT command AIF. The AT command AIF is a tunnel between a first endpoint and a second endpoint and extends through a network of the telematics unit 114, e.g. a network connecting the TCU 128 to the NAD 127. The AT command AIF tunnel also extends through the WWAN 104. The first endpoint can be but is not limited to any of the routing element 142 of the OCC 108, the server 144, or another network element or a component thereof. The second endpoint can be but is not limited to any of the MDM interface 340A, the MDM interface 340B, the baseband processor 124, or any other network component of the NAD. The first and second endpoints can be identified by a port number, an IP address, and a protocol type. For example, the second endpoint can be identified by a port number of the MDM interface 340A, an IP address of the TCU processor 160, and the TCP protocol.

At step 510, the baseband processor 124 creates one or multiple AT response data packets for sending through an AT response AIF. In particular, the one or multiple AT response data packets are created by the baseband processor 124, and in particular by a response data packet production module of the baseband processor 124. The one or multiple AT response data packets include a payload and control information. The baseband processor, by utilizing the response data packet production module, is configured to write an AT command response into the payload of the response data packet and is further configured to write data representative of control information into the response data packet. For example, the response data packet production module is configured to write control information specifying the AT response AIF into a header of the response data packet. The control information can include, for example, a port number, an IP address, and a protocol type identifying a network interface at the routing element 142 of the OCC 108. The command data packets can be stored temporarily in a volatile or non-volatile storage medium of the NAD 126, for example the flash memory 166 or the RAM 167.

At 520, the baseband processor 124 transmits the response data packets for modulation and transmission through the AT response AIF. Modulation and transmission through the AT response AIF at 530 can be performed by the wireless modem 125 of the NAD 126 or may be distributed between the wireless modem 125 of the NAD 126 and the dual mode antenna 129 of the telematics unit 114. The AT response AIF is a tunnel between a first endpoint and a second endpoint and extends through a network of the telematics unit 114, e.g. a network connecting the TCU 128 to the NAD 126.

Figure 6:
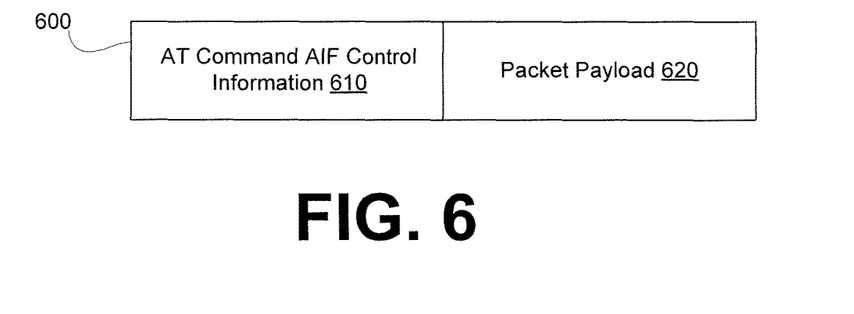
FIG. 6 is a block diagram of a command data packet according to an implementation of the principles described herein.

FIG. 6 is a block diagram of a command data packet 600 according to one embodiment. The command data packet 600 includes a packet header 610 and a packet payload 620. The packet header 610 includes control information that identifies an AT command AIF dedicated to the transmission of AT commands. The AT command AIF can be a tunnel between a first endpoint and a second endpoint and extends through a network of the telematics unit 114, e.g. a network connecting the TCU 128 to the NAD 126. The AT command AIF tunnel also extends through the WWAN 104. In various implementations, the AT command AIF tunnel can be established using PPP where the first endpoint and the second endpoint are virtual physical network interfaces identified by a network address. In such implementations, as well as in other implementations where the first and second endpoints are identified by a network address, the packet header 610 can include one or both of the network address identifying the first endpoint and the network address identifying the second endpoint. The network addresses of the first endpoint and the second endpoint can include a specific IP address and port combination that identifies, e.g. one or more of the MDM interface 340A and the MDM interface 340B. The packet header 610 can additionally identify a transport protocol, e.g. TCP or PPP.

Figure 7:
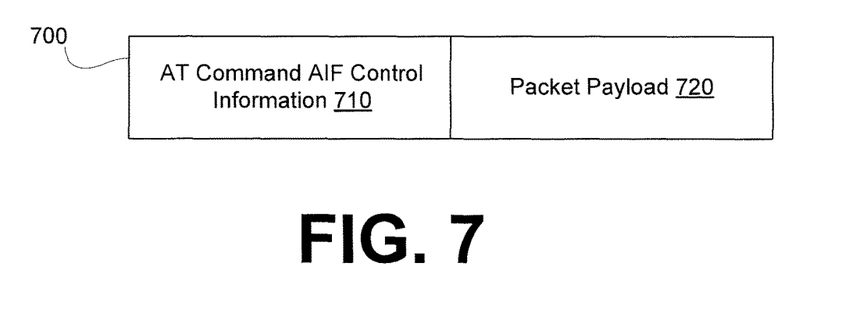
FIG. 7 is a block diagram of a response data packet according to an implementation of the principles described herein.

The packet payload 620 includes one or more AT commands to be executed by the baseband processor 124 or by the wireless modem 125. The AT commands included in the packet payload 620 may include commands for various phone-line manipulations, dialing and hanging-up. The AT commands included in the packet payload 620 may also include various controls to set up the wireless modem 125, including a set of register commands which allows the various memory locations utilized by baseband processor and the wireless modem 125 to be set. Furthermore, the AT commands included in the packet payload 620 may include commands for updating and reconfiguring software utilized by the baseband process 124 and the wireless modem 125 during transmission of data to and from the OCC FIG. 7 is a block diagram of a response data packet 700 according to one embodiment. The response data packet 700 includes a packet header 710 and a packet payload 720. The packet header 710 includes control information that identifies an AT response AIF dedicated to the transmission of AT command responses. The AT response AIF can be a tunnel between a first endpoint and a second endpoint and extends through a network of the telematics unit 114, e.g. a network connecting the TCU 128 to the NAD 127. The AT response AIF tunnel also extends through the WWAN 104. In various implementations, the AT response AIF tunnel can be established using PPP where the first endpoint and the second endpoint are virtual physical network interfaces identified by a network address. In such implementations, as well as in other implementations where the first and second endpoints are identified by a network address, the packet header 710 can include one or both of the network address identifying the first endpoint and the network address identifying the second endpoint. The network addresses of the first endpoint and the second endpoint can include a specific IP address and port combination that identifies, e.g. one or more of the MDM interface 340A and the MDM interface 340B. The packet header 710 can additionally identify a transport protocol, e.g. TCP or PPP. The packet payload 720 includes one or more AT command responses, e.g. a confirmation that a requested command has been completed and data identifying an updated configuration.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method, implemented at a server of an operations control center of a telematics service provider (TSP), for transmitting commands to a network access device (NAD) of a vehicular telematics unit, the method comprising:
   creating a command data packet, the command data packet comprising:
      a payload that includes an attention (AT) command, and
      a control information that includes an identification of an AT command air interface (AIF) dedicated to transmission of AT commands to the NAD of the vehicular telematics unit; and
   transmitting, by the server, the command data packet to the NAD of the vehicular telematics unit via the AT command AIF,
   wherein the AT command AIF is a first tunnel extending through a network of the vehicular telematics unit.

2. The method of claim 1, further comprising:
   receiving, by the server via an AT command response AIF dedicated to transmission of AT command responses, a response data packet comprising:
      a payload that includes a response to the AT command, and
      a control information that includes an identification of the AT command response AIF,
   wherein the AT command response AIF is a second tunnel extending through the network of the vehicular telematics unit.

3. The method of claim 1, wherein the first tunnel additionally extends through a wireless wide area network (WWAN).

4. The method of claim 1, wherein the first tunnel comprises a first endpoint and a second endpoint.

5. The method of claim 4, wherein the first endpoint and the second endpoint are virtual physical network interfaces.

6. The method of claim 4, wherein point-to-point protocol (PPP) is used for routing transmissions between the first endpoint and the second endpoint.

7. The method of claim 4, wherein the first endpoint corresponds to the server, and
   wherein the second endpoint corresponds to a baseband processor of the NAD.

8. The method of claim 1, wherein the first tunnel additionally extends through a network interface of a telematics control unit (TCU) of the vehicular telematics unit.

9. The method of claim 7, wherein the network interface of the TCU is operated by one of a mobile broadband interface model (MBIM) driver or a universal serial bus (USB) driver.

10. The method of claim 1, wherein the first tunnel additionally extends through a network interface of the NAD.

11. The method of claim 10, wherein the network interface of the NAD is operated by one of a mobile broadband interface model (MBIM) driver or a universal serial bus (USB) driver.

12. The method of claim 1, wherein the at least one AT command is directed at one or more of the group consisting of:
   a controlling program stored at the NAD,
   a controlling function for interacting with firmware of the NAD,
   a real-time operating system (RTOS) of the NAD,
   a configuration function for modifying radio control functions performed by the NAD,
   a controlling function for activating telematics service on the NAD, and
   a controlling function for terminating telematics service on the NAD.

13. A method, implemented at a baseband processor of a network access device (NAD) of a vehicular telematics unit, for receiving commands from a server of an operations control center (OCC) of a telematics service provider, the method comprising:
   receiving, by the baseband processor via an AT command air interface (AIF) dedicated to transmission of AT commands to the NAD of the vehicular telematics unit, a command data packet comprising:
      a payload that includes an attention (AT) command, and
      a control information that includes an identification of the AT command delivery-AIF;
   creating, by the baseband processor, a response data packet comprising:
      a payload that includes a response to the AT command, and
      a control information that includes an identification of the AT command response AIF; and
   transmitting, by the baseband processor, the response data packet to the NAD of the vehicular telematics unit via the AT command response AIF;
   wherein the AT command AIF is a first tunnel extending through a network of the vehicular telematics unit, and
   wherein the AT command response AIF is a second tunnel extending through a network of the vehicular telematics unit.

14. The method of claim 13, wherein the first tunnel and the second tunnel additionally extend through a wireless wide area network (WWAN).

15. The method of claim 13, wherein the first tunnel comprises a first endpoint and a second endpoint, and
   wherein the second tunnel comprises the first endpoint and the second endpoint.

16. The method of claim 15, wherein the first endpoint and the second endpoint are virtual physical network interfaces.

17. The method of claim 15, wherein point-to-point protocol (PPP) is used for routing transmissions between the first endpoint and the second endpoint.

18. The method of claim 15, wherein the first endpoint corresponds to the server, and wherein the second endpoint corresponds to a baseband processor of the NAD.

19. The method of claim 1, wherein the first tunnel additionally extends through a network interface of a telematics control unit (TCU) of the vehicular telematics unit, and
wherein the network interface of the TCU is operated by one of a mobile broadband interface model (MBIM) driver or a universal serial bus (USB) driver.

20. A system for transmitting commands from a server of an operations control center (OCC) of a telematics service provider to a baseband processor of a network access device (NAD) of a vehicular telematics unit, the system comprising:
the server of the OCC of the telematics service provider, the server comprising:
a command data packet production module configured to create a command data packet comprising:
a payload that includes an attention (AT) command, and
a control information that includes an identification of an AT command delivery air interface (AIF) dedicated to transmission of AT commands to the NAD of the vehicular telematics unit, and
a transmission module configured to provide the command data packet to a modulator for encoding of digital information represented in the command data packet into a transmittable signal; and
the baseband processor of the NAD, the baseband processor comprising:
a receiving module configured to receive, via a demodulator, the command data packet,
a response data packet production module configured to create a response data packet comprising:
a payload that includes a response to the AT command, and
a control information that includes an identification of an AT command response AIF dedicated to transmission of AT command responses, and
a transmission module configured to provide the response data packet to a modulator for encoding of digital information represented in the response data packet into a transmittable signal,
wherein the AT command AIF is a first tunnel extending through a network of the vehicular telematics unit.

\* \* \* \* \*